Patented Feb. 25, 1941

2,233,376

UNITED STATES PATENT OFFICE 2,233,376

PREPARATION OF COLLOIDAL SUSPENSIONS

Luciano Gartiez Scott, Prince Rock, Plymouth, England, assignor to Acheson Colloids Corporation, Port Huron, Mich., a corporation of Michigan No Drawing. Application April 2, 1940, Serial No. 327,542. In Great Britain April 14, 1939

7 Claims. (Cl. 252—29)

The invention relates to the manufacture of colloidal suspensions of solid lubricants, e. g. substances of crystalline structure having high cleavage and low cohesion in one or more directions of the crystal lattice, such as graphite, mica, talc and the like materials, in non-aqueous media, for example in mineral oil, and in particular is concerned with the preparation of such suspension by transfer of colloidal suspension of the substances from aqueous media to non-aqueous media.

Methods of transferring suspended material from aqueous to non-aqueous media are known and have been described in British patent specifications Nos. 27,312 of 1907 and 4,155 of 1912.

An example of a method of carrying out a transfer of suspended material from an aqueous medium to oil is as follows:

Powdered graphite is mixed with about 10–20 per cent. of a deflocculating agent, or protective colloid, such as tannin and the like, and with sufficient water to make up a paste which can be ground in a suitable mill. The paste is subjected to grinding, after which it is diluted and the coarser particles are separated from the colloidal particles by sedimentation, or other methods. The solution containing the colloidal particles is then concentrated by means of filter presses or otherwise. The resulting paste may contain approximately 50 per cent. solids and 50 per cent. water. The exact amount of water is, however, not critical. This paste is mixed with an equal part of an oil and the mass is agitated, whereby at a certain point water is exuded and is finally completely displaced by the oil.

There are certain difficulties arising in connection with transferring processes, the nature of which was not fully understood. It was found that not all oils are equally suitable for this transferring process, that in certain cases no separation of the water occurred and that in other cases where separation occurred the resulting suspension of graphite in oil was not stable.

It is an object of the present invention to provide an improved process of transferring suspended material from aqueous to non-aqueous media, whereby more consistent and satisfactory transfer is effected.

It is a further object of the present invention to provide an improved transfer process whereby stable non-aqueous colloidal suspension of solid lubricants may be obtained.

A further object of the invention is to provide a new transfer medium comprising electrionised vegetable oil.

According to the invention improved colloidal suspensions in non-aqueous media are obtained by transfer of aqueous suspension to a medium consisting of or comprising a vegetable oil which, with or without a diluent, has been subjected to the action of silent electric discharge.

Vegetable oil which has been subjected to the action of silent electric discharge contains bodies of high molecular weight which act as protective colloids. It is known as electrionised oil or "Elektrion" or "Voltol" oil. Rapeseed oil is a suitable vegetable oil. Examples of other vegetable oils which may be used are:

Black mustard seed oil   Soya bean oil
White mustard seed oil   Sesame oil
Linseed oil              Tung oil
Cottonseed oil           Sunflower oil
Hempseed oil             Walnut oil The transfer medium may comprise the electrionised oil in any proportion, for example up to 50%, the remainder being desirably mineral oil.

The following is an example of a convenient manner of carrying the invention into effect, as applied to colloidal suspensions of graphite.

An aqueous dispersion of graphite which may, for example, be prepared in the manner described above, is agitated with a quantity of Elektrion oil in the proportion ten parts of aqueous graphite to four parts of Elektrion oil. After about half an hour of agitating the mixture, water separates from the mixture and the material is then worked for a further quarter of an hour approximately. No heat is employed in this process, but after the separation the last traces of water are driven off by applying a vacuum and raising the temperature to between 150 and 160° F. The composition is then diluted by the addition of oil, which may be mineral oil or Elektrion oil or a mixture of the two, so that the final graphite content is about 10% by weight.

An aqueous dispersion of graphite may in the same manner be transferred to a mixture of electrionised vegetable oil and a diluent in which the electrionised vegetable oil is present in any convenient amount, for example up to 50%. Also the colloidal suspensions prepared according to the invention may be diluted with any suitable diluent which is compatible with the electrionised vegetable oil.

Suitable diluents for dilution of electrionised vegetable oil for use as transfer medium, or for dilution of the colloidal suspension prepared according to the invention, are mineral oil, aromatic hydrocarbons, for example benzene, toluene and homologues, aliphatic hydrocarbons, for example gasoline, kerosene, etc., chlorinated aliphatic or aromatic hydrocarbons, alcohols, ethers, esters, etc.

Suspensions of other substances of crystalline structure having high cleavage and low cohesion in one or more directions of the crystal lattice, for example mica and talc, may be prepared in the manner described above.

I claim:

1. In the preparation of a colloidal suspension of a solid lubricant in non-aqueous medium by transfer from an aqueous suspension of the lubricant, the improvement which consists in effecting the transfer to a medium comprising electrionised vegetable oil.

2. In the preparation of a colloidal suspension of a solid lubricant the improvement which consists in mechanically working an aqueous colloidal suspension of the lubricant in the presence of a non-aqueous medium comprising vegetable oil which has been subjected to the action of silent electric discharge, whereby to effect transfer of the suspension of the lubricant to the non-aqueous medium.

3. The method of preparing a suspension of graphite in a non-aqueous medium wherein an aqueous colloidal suspension of graphite is mechanically worked in the presence of vegetable oil which has been subjected to the action of silent electric discharge, whereby to transfer the graphite from the aqueous medium to the said oil, and the water is subsequently removed.

4. In the preparation of a colloidal suspension of a solid lubricant in non-aqueous medium by transfer from an aqueous colloidal suspension, the improvement which consists in employing as the non-aqueous medium to which the transfer is made a mixture of a hydrocarbon diluent and vegetable oil which has been subjected to silent electric discharge.

5. The method claimed in claim 3 wherein the said vegetable oil which has been subjected to the action of silent electric discharge is employed in association with a diluent.

6. The method claimed in claim 3 wherein the said vegetable oil which has been subjected to the action of silent electric discharge is employed in admixture with mineral oil.

7. The method claimed in claim 3 wherein the resulting suspension is heated to drive off the last traces of water.

LUCIANO GARTIEZ SCOTT.